(12) United States Patent
Yamane et al.

(10) Patent No.: US 10,046,646 B2
(45) Date of Patent: Aug. 14, 2018

(54) POWER CONVERSION SYSTEM FOR ELECTRIC VEHICLES

(71) Applicant: SAMSUNG SDI CO., LTD., Yongin-si, Gyeonggi-do (KR)

(72) Inventors: Futoshi Yamane, Yokohama (JP); Masami Ishikawa, Yokohama (JP); Yoshinari Murayama, Yokohama (JP); Mitsutoshi Muraoka, Yokohama (JP); Taro Yoshida, Yokohama (JP); Kenji Furusawa, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 608 days.

(21) Appl. No.: 14/448,692

(22) Filed: Jul. 31, 2014

(65) Prior Publication Data
US 2015/0069832 A1    Mar. 12, 2015

(30) Foreign Application Priority Data

Sep. 6, 2013   (JP) .................................. 2013-184644
Nov. 1, 2013   (JP) .................................. 2013-228572
Feb. 27, 2014  (KR) ........................ 10-2014-0023393

(51) Int. Cl.
*B60L 11/18*    (2006.01)
*H02M 7/5387*   (2007.01)
(Continued)

(52) U.S. Cl.
CPC ............. *B60L 11/1803* (2013.01); *B60L 1/00* (2013.01); *B60L 3/003* (2013.01); *B60L 3/0092* (2013.01);
(Continued)

(58) Field of Classification Search
CPC .... B60L 1/00; B60L 11/1803; B60L 11/1868; B60L 15/007; B60L 3/003; B60L 3/0092;
(Continued)

(56) References Cited

U.S. PATENT DOCUMENTS 5,373,195 A   12/1994   De Doncker et al.
8,564,982 B2  10/2013   Song et al.
(Continued)

FOREIGN PATENT DOCUMENTS

JP   4-178168   6/1992
JP   7-177738   7/1995
(Continued)

OTHER PUBLICATIONS

EPO Third Party Observation dated Aug. 23, 2016, for corresponding European Application 14183867.2, (3 pages).
(Continued)

*Primary Examiner* — Thienvu Tran
*Assistant Examiner* — Brian K Baxter
(74) *Attorney, Agent, or Firm* — Lewis Roca Rothgerber Christie LLP (57) ABSTRACT

A power conversion system including a DC main power supply for supplying a DC voltage, boosting circuits for performing a retrogression operation of boosting the DC voltage and comprising driving circuits, an inverter circuit for converting the DC voltage into an AC voltage, a motor/generator for receiving the AC voltage, and a control circuit for outputting a control signal to the driving circuits and stopping an operation of a faulty boosting circuit of the boosting circuits when one of the boosting circuits is faulty, for setting power control values depending on a number of remaining non-faulty boosting circuits of the boosting circuits, and for controlling the remaining non-faulty boosting circuits and the inverter circuit based on the power control
(Continued)

values, wherein the inverter circuit and the boosting circuits perform a regeneration operation of supplying regeneration power to the DC main power supply, peripheral equipment, and/or a DC auxiliary power supply.

4 Claims, 3 Drawing Sheets

(51) Int. Cl.
*H02M 3/155* (2006.01)
*B60L 3/00* (2006.01)
*B60L 15/00* (2006.01)
*B60L 1/00* (2006.01)
*B60L 7/14* (2006.01)

(52) U.S. Cl.
CPC ............ *B60L 7/14* (2013.01); *B60L 11/1868* (2013.01); *B60L 15/007* (2013.01); *H02M 3/155* (2013.01); *H02M 7/53875* (2013.01); *B60L 2210/12* (2013.01); *B60L 2210/14* (2013.01); *B60L 2210/42* (2013.01); *Y02T 10/644* (2013.01); *Y02T 10/645* (2013.01); *Y02T 10/7005* (2013.01); *Y02T 10/7066* (2013.01); *Y02T 10/7225* (2013.01); *Y02T 10/7233* (2013.01); *Y02T 10/7241* (2013.01)

(58) Field of Classification Search
CPC .... B60L 7/14; B60L 2210/12; B60L 2210/14; B60L 2210/42; H02M 3/155; H02M 7/53875; Y02T 10/644; Y02T 10/645; Y02T 10/7005; Y02T 10/7066; Y02T 10/7225; Y02T 10/723; Y02T 10/7241
USPC .................................. 307/101, 9.1
See application file for complete search history.

(56) References Cited

U.S. PATENT DOCUMENTS

| | | | |
|---|---|---|---|
| 8,884,627 B2 | 11/2014 | Minamii et al. | |
| 8,957,535 B2* | 2/2015 | Hjort | F03D 7/0272 290/44 |
| 2010/0033011 A1* | 2/2010 | Okazaki | B60L 7/12 307/9.1 |
| 2010/0244558 A1* | 9/2010 | Mitsutani | B60K 6/32 307/9.1 |
| 2010/0273072 A1 | 10/2010 | Hasegawa et al. | |
| 2011/0040436 A1* | 2/2011 | Yamamoto | B60K 6/32 701/22 |
| 2011/0077812 A1* | 3/2011 | Ichikawa | B60K 6/445 701/22 |
| 2011/0087395 A1* | 4/2011 | Yamamoto | B60K 6/445 701/22 |
| 2011/0178664 A1* | 7/2011 | Yamamoto | B60L 3/0046 701/22 |
| 2011/0208383 A1* | 8/2011 | Yamamoto | B60L 7/16 701/22 |
| 2011/0251745 A1* | 10/2011 | Yamamoto | B60L 7/16 701/22 |
| 2011/0257825 A1* | 10/2011 | Yamamoto | B60L 3/0092 701/22 |
| 2012/0010771 A1* | 1/2012 | Kato | B60K 6/445 701/22 |
| 2012/0013184 A1* | 1/2012 | Kato | B60K 6/365 307/9.1 |
| 2012/0022738 A1* | 1/2012 | Kato | B60K 6/445 701/22 |
| 2012/0065827 A1* | 3/2012 | Kimura | B60L 11/1811 701/22 |
| 2012/0089290 A1* | 4/2012 | Kato | B60K 6/445 701/22 |
| 2012/0109442 A1* | 5/2012 | Kato | B60W 10/26 701/22 |
| 2012/0229061 A1* | 9/2012 | Itoh | B60L 3/003 318/400.3 |
| 2015/0115611 A1* | 4/2015 | Hjort | F03D 7/0272 290/44 |
| 2015/0123404 A1* | 5/2015 | Hjort | F03D 7/0272 290/44 |

FOREIGN PATENT DOCUMENTS

| | | |
|---|---|---|
| JP | 2003-284336 | 10/2003 |
| JP | 2008-79447 | 4/2008 |
| JP | 2008-131715 | 6/2008 |
| JP | 2010-193684 | 9/2010 |
| JP | WO2010/143277 A1 | 12/2010 |
| JP | WO2010/146688 A1 | 12/2010 |
| KR | 10-2012-0025641 | 3/2012 |
| WO | WO 2006/137112 A1 | 12/2006 |

OTHER PUBLICATIONS

EPO Search Report dated Jan. 8, 2015, for corresponding European Patent application 14183867.2, (4 pages).
English machine translation of Japanese Publication No. JP 2008-131715, dated Jun. 5, 2008, 19 pages.
English machine translation of Japanese Publication No. JP 2010-193684, dated Sep. 2, 2010, 22 pages.
Anonymous et al., "Low-ESR-Elektrolytkondensatoren," Elektronik Kompendium, Aug. 26, 2013, Retrieved from the Internet, URL: http://www.elektronik-kompendium.de/sites/bau/0810091.htm [retrieved on Apr. 4, 2017], along with English translation of relevant part, 8 pages.
EPO Summons to attend oral proceedings dated Jun. 1, 2017, for corresponding European Patent Application No. 14183867.2 (7 pages).
EPO Office Action dated Nov. 4, 2016, for corresponding European Patent Application No. 14183867.2 (6 pages).
JPO Office Action dated Jan. 30, 2018, for corresponding Japanese Patent Application No. 2013-228572 (6 pages).
EPO Decision of Rejection dated Nov. 23, 2017, for corresponding European Patent Application No. 14183867.2 (15 pages).

* cited by examiner

POWER CONVERSION SYSTEM FOR ELECTRIC VEHICLES

CROSS-REFERENCE TO RELATED APPLICATION

This application claims priorities to and the benefit of Japanese Patent Application Nos. 2013-184644 and 2013-228572 filed in the Japanese Patent Office on Sep. 6, 2013 and Nov. 1, 2013, respectively, and Korean Patent Application No. 10-2014-0023393 filed in the Korean Intellectual Property Office on Feb. 27, 2014, the entire contents of which are incorporated herein by reference.

BACKGROUND

1. Field

The present invention relates to a power conversion system for electric systems, and more particularly, to a power conversion system for electric vehicles.

2. Description of the Related Art

A power conversion system, which may be used in electric vehicles, may be capable of performing a retrogression operation (e.g., a downgrade operation or the operation of going from a better/higher state to a worse/lesser state) of boosting a DC voltage of a DC main power supply (e.g., DC voltage of a 48V battery) using a single boosting circuit, converting the DC voltage into an AC voltage using an inverter circuit, and outputting the AC voltage to a motor/generator. The power conversion system may also be capable of performing a regeneration operation of supplying regeneration power of the motor/generator to the DC main power supply, peripheral equipment (e.g., an electric power steering, an air conditioner, an engine control unit (ECU), and the like) of an electric vehicle, and an DC auxiliary power supply (e.g., an auxiliary 12V/24V battery) via the inverter circuit and the boosting circuit.

When using the power conversion system in the electric vehicles, there may not be a need for an alternator, which supplies power to the DC power supply, the peripheral devices of an electric vehicle, and the DC auxiliary power supply. However, when a single boosting circuit stops due to a defect, an electric circuit for recovering power to the DC main power supply or the DC auxiliary power supply is faulty (e.g., broken or malfunctioning) and therefore the regeneration operation from the motor/generator may not be performed. Accordingly, the electric vehicle may not be driven in the state in which the power of the DC auxiliary power supply is depleted.

The above information disclosed in this Background section is only for enhancement of understanding of the background of the invention and therefore it may contain information that does not form the prior art that is known to a person of ordinary skill in the art.

SUMMARY

Aspects of embodiments of the present invention are directed toward a power conversion system for electric vehicles that improves (e.g., increases) a redundancy of the power conversion system and continuously performs a retrogression operation (e.g., a downgrade operation) or a regeneration operation using the remaining non-faulty (e.g., normal) boosting circuits even when some of the boosting circuits are faulty (e.g., are inoperative, malfunctioning, or broken).

According to an embodiment of the present invention, there is provided a power conversion system for electric vehicles, the power conversion system including: a DC main power supply configured to supply a DC voltage; a plurality of boosting circuits coupled to the DC main power supply and configured to perform a retrogression operation of boosting the DC voltage, each one of the plurality of boosting circuits comprising a corresponding one of a plurality of driving circuits; an inverter circuit coupled to the plurality of boosting circuits and configured to convert the boosted DC voltage into an AC voltage; at least one of a motor or generator coupled to the inverter circuit and configured to receive the AC voltage; and a control circuit configured to output a control signal to the plurality of driving circuits and to stop an operation of a faulty boosting circuit of the plurality of boosting circuits when at least one of the plurality of boosting circuits is faulty, to set power control values depending on a number of remaining non-faulty boosting circuits of the plurality of boosting circuits, and to control the remaining non-faulty boosting circuits and the inverter circuit based on the power control values, wherein the inverter circuit and the plurality of boosting circuits are configured to perform a regeneration operation of supplying regeneration power to at least one of the DC main power supply, peripheral equipment, or a DC auxiliary power supply.

Through this configuration, the power supply to the auxiliary equipment (e.g., an electric power steering, an air conditioner, an engine control unit (ECU), and/or the like) of the vehicle and the DC auxiliary power supply (e.g., auxiliary 12V/24V battery) may be performed by the regeneration power of the motor/generator and, an alternator may be omitted, and a reduction in costs and weight of the vehicle may be achieved.

Further, a plurality of boosting circuits may be coupled in parallel, thereby improving (e.g., increasing) the redundancy for the power supply of the power conversion system. In this case, even when the alternator is omitted, the boosting circuits may be coupled in parallel, thereby supplying power to the DC main power supply, the auxiliary equipment of the vehicle, and the DC auxiliary power supply.

Further, as the boosting circuits are coupled in parallel, a current may be dispersed to each of the boosting circuits, thereby improving performance by, for example, increasing efficiency of the boosting circuit and miniaturizing and expanding the lifespan of the parts.

Further, when at least one of the boosting circuits is faulty (e.g., is malfunctioning or not operating as designed or is broken), power control values depending on the number of remaining non-faulty (e.g., normal) boosting circuits may be set and the number of remaining non-faulty boosting circuits and the inverter circuit may be controlled based on the power control values, such that the motor/generator may be continuously operated in a power restriction manner even when some of the boosting circuits are faulty, thereby charging the regeneration power in the DC main power supply, the auxiliary equipment of the vehicle, and the DC auxiliary power supply.

Therefore, it is possible to construct a limp home mode system (e.g., a system that allows an electric vehicle to remain operable despite detecting a serious error), allowing a driver sufficient time to safely evacuate a vehicle or move/drive the vehicle to a service center or the driver's home.

The plurality of boosting circuits may include a plurality of smoothing capacitors, and each of the plurality of smoothing capacitors may be configured to operate as a smoothing capacitor for an input terminal of the inverter circuit.

As described above, the output terminals of each of the boosting circuits, which are coupled in parallel, may be coupled to (e.g., provided with) the smoothing capacitors, thereby reducing a ripple current at the time of charging and discharging of the smoothing capacitor when power is exchanged with the inverter circuit by the current dispersion. Therefore, further miniaturization of the smoothing capacitor or further reduction of loss of the smoothing capacitor and further improvement in the performance of the smoothing capacitor, may be achieved as compared to the related art.

Further, the smoothing capacitor located at the output terminal of the boosting circuit may be operated as the smoothing capacitor at an input terminal of the inverter circuit, thereby further increasing capacitance, due to the parallel connection of the smoothing capacitors, as compared to the related art, and further increasing the capacitance per part volume of the smoothing capacitor by structurally integrating the smoothing capacitors.

For example, in the regeneration operation of the motor/generator, when a switch (DC contactor) or a distribution circuit (junction box), both of which are located at the output terminal of the DC main power supply, is faulty and an electric circuit is disconnected from the DC main power supply, the capacitance may be increased, thereby improving (e.g., increasing) the fault tolerance of the inverter circuit and the boosting circuit.

Further, a parasitic component may be reduced by structurally integrating the smoothing capacitors, the fault tolerance of the circuit components may be improved (e.g., increased), and at the time of the regeneration operation of the motor/generator, the quality of power supplied to each auxiliary equipment and the DC auxiliary power supply of the vehicle may be improved.

In an embodiment, each of the plurality of boosting circuits includes a reactor.

The power conversion system of claim may further include: a plurality of current detection units corresponding to the plurality of boosting circuits, each of the plurality of current detection units being configured to detect a current flowing in the reactor of a corresponding one of the plurality of boosting circuits, wherein the control circuit is further configured to detect a fault of each of the plurality of boosting circuits based on the detected flowing current of each of the plurality of boosting circuits.

Further, each of the driving circuits may be configured to detect a fault of a corresponding one of the plurality of boosting circuits and to generate a corresponding fault signal, and the control circuit may be further configured to detect the faulty boosting circuit based on the corresponding fault signal of each of the driving circuits.

According to the example embodiments of the present invention, it is possible to improve the redundancy for the power supply of the power conversion system and continuously perform the retrogression operation or the regeneration operation using the remaining non-faulty boosting circuits even though some of the boosting circuits are faulty.

DETAILED DESCRIPTION

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled to" or "connected to" another element, the elements may be directly coupled for connected, or one or more elements may be interposed therebetween. The elements may also be electrically coupled or electrically connected to each other.

In addition, unless explicitly described to the contrary, the word "comprise" and variations such as "comprises" or "comprising", will be understood to imply the inclusion of stated elements and not the exclusion of any other elements.

Hereinafter, a power conversion system for electric vehicles, according to an example embodiment, will be described with reference to the accompanying drawings.

A power conversion system 100 for electric vehicles, according to an example embodiment, is equipped in electric vehicles such as a hybrid vehicle and an electric vehicle to perform a retrogression operation (e.g., a downgrade operation or the operation of going from a better/higher state to a worse/lesser state) or a regeneration operation of a motor/generator 5. The hybrid vehicle using the motor/generator 5 may include any one of a parallel type, a split type (serial-parallel type), and a serial type.

Figure 1:
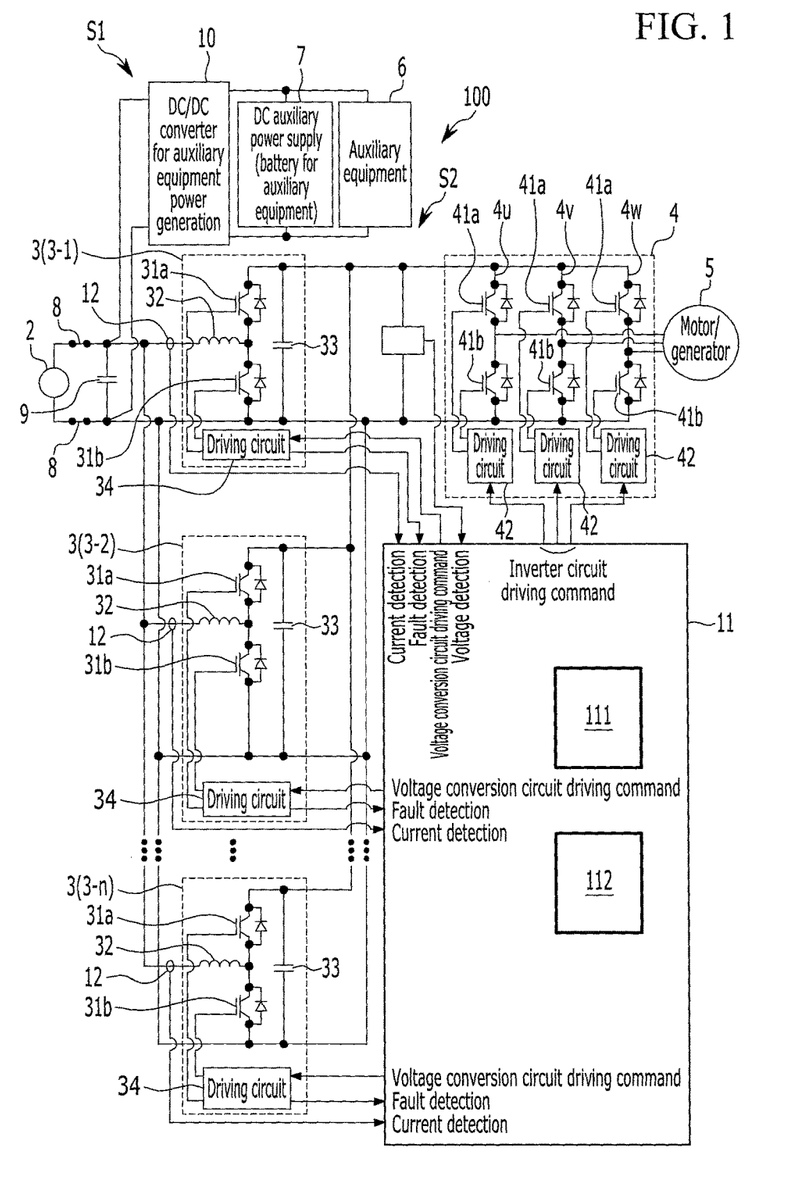
FIG. 1 is a schematic diagram illustrating a circuit configuration of a power conversion system for electric vehicles, according to an example embodiment of the present invention.

As illustrated in FIG. 1, the power conversion system 100 for electric vehicles performs a retrogression operation of boosting a DC voltage of a DC main power supply 2 using a boosting circuit 3, converting the DC voltage into a three-phase AC voltage using an inverter circuit 4, and outputting the three-phase AC voltage to the motor/generator 5, and performs a regeneration operation of supplying regeneration power of the motor/generator 5 to the DC main power supply 2, auxiliary equipment 6 of the electric vehicle, and a DC auxiliary power supply 7 via the inverter circuit 4 and the boosting circuit 3.

In one embodiment, the power conversion system 100 for electric vehicles includes the DC main power supply 2 (e.g., a lithium ion battery supplying 48V), switches (e.g., DC contactors) 8 performing an opening and closing of electric circuits and coupled to (e.g., connected to) both output terminals of the DC main power supply 2, a smoothing capacitor (e.g., a smoothing condenser 9 or a DC link condenser) located between the respective switches 8, a voltage conversion system S1 and a power conversion system S2. The voltage conversion system S1 is coupled via the smoothing capacitor 9 and supplies power to each auxiliary equipment (e.g., an electric power steering, an air conditioner, an engine control unit (ECU), and the like) 6 and a DC auxiliary power supply (e.g., 12V/24V battery) 7 of electrical vehicles. The power conversion system S2 is coupled in parallel to the voltage conversion system S1 and the smoothing capacitor 9 and provides the retrogression operation or the regeneration operation of the motor/generator 5.

The voltage conversion system S1 further includes a DC/DC converter 10 and both output terminals of the DC/DC converter 10 are coupled to each auxiliary equipment 6 and the DC auxiliary power supply 7 of electrical vehicles. For example, the DC/DC converter 10, the auxiliary equipment 6, and the DC auxiliary power supply 7 may be electrically coupled in parallel.

The power conversion system S2 includes the boosting circuit 3, which performs voltage conversion on the DC voltage of the DC main power supply 2, and the inverter circuit 4, which converts the DC voltage output from the boosting circuit 3 into the AC voltage and outputs the AC voltage to the motor/generator 5. The boosting circuit 3 has an interleaved configuration in which N boosting circuits 3, 3-1, 3-2, are coupled in parallel.

Each boosting circuit 3 may include power semiconductors 31a and 31b, such as IGBTs and MOSFETs, a reactor 32, and a smoothing capacitor 33.

In one embodiment, each boosting circuit 3 includes an upper arm 31a and a lower arm 31b, which are power semiconductors coupled in series. A semiconductor terminal (e.g., a collector terminal or a drain terminal) of the upper arm 31a may be coupled to a positive terminal of the inverter circuit 4 and a first terminal (e.g., an emitter terminal or a source terminal) of the lower arm 31b may be coupled to a negative terminal of the DC main power supply 2.

Further, the smoothing capacitor 33 is coupled to an output terminal of the boosting circuit 3 and is coupled between a first terminal of the upper arm 31a and a first terminal of the lower arm 31b, and is thus coupled in parallel with a combination in series of the upper arm 31a and the lower arm 31b.

Further, one terminal of the reactor 32 is coupled between a second terminal (e.g., emitter terminal or source terminal) of the upper arm 31a and a second terminal (e.g., collector terminal or drain terminal) of the lower arm 31b (the connection node may be referred to as a serial connection point), and the other terminal of the reactor 32 is coupled to the positive terminal of the DC main power supply 2. The upper arm 31a and the lower arm 31b of the boosting circuit 3 may be configured by coupling (e.g., connecting) freewheeling diodes in an antiparallel configuration.

Each of the configured N boosting circuits 3 are independently provided with driving circuits 34 for driving the upper arm 31a and the lower arm 31b. The reactor 32 is charged and discharged by alternately switching the upper arm 31a and the lower arm 31b at a duty ratio (e.g., a predetermined duty ratio) by the driving circuit 34 to transfer power in a retrogression direction (also referred to as boosting) and a regeneration direction (also referred to as bucking).

A driving command signal (e.g., a control signal) may be input to the driving circuit 34 from a control circuit 11 as described below. The driving circuits 34 are included in the boosting circuits 3 (e.g., are independently located in each of the boosting circuits 3) and therefore even though some of the boosting circuits 3 are faulty (e.g., are malfunctioning, not functioning/operating normally or as designed, or broken), the remaining non-faulty (e.g., normal) boosting circuits 3 may be normally driven.

Further, according to an embodiment, the smoothing capacitors (e.g., smoothing condenser) 33 is included in each of the boosting circuits 3, which are coupled in parallel, thereby reducing a ripple current at the time of charging and discharging of the smoothing capacitor 33 when power is exchanged with the inverter circuit 4 and improving the performance of the smoothing capacitor 33, compared to the related art. The reduction in ripple current and improvement in performance may be achieved by current dispersion and miniaturization of the smoothing capacitor 33 or reduction in loss of the smoothing capacitor 33.

Further, the smoothing capacitor 33, which is included in each of the boosting circuits 3, is operated as a smoothing capacitor for an input terminal of the inverter circuit 4. Thus, each boosting circuit 3 and the inverter circuit 4 commonly use the smoothing capacitor 33.

Therefore, a parallel circuit of the smoothing capacitor 33 for the input terminal of the inverter circuit 4 is configured, thereby increasing capacitance compared to the related art and increasing the capacitance per part volume of the smoothing capacitor (e.g., a smoothing condenser) 33 by structurally integrating the smoothing capacitors 33. Further, a parasitic component may be reduced by structurally integrating the smoothing capacitors 33 and, as a result, the fault tolerance of the circuit components may be improved.

The inverter circuit 4 includes a three-phase bridge circuit which is configured by coupling three switching circuits 4u, 4v, and 4w including power semiconductors 41a and 41b, such as IGBT and MOSFET, coupled in parallel.

In one embodiment, the switching circuits 4u, 4v, and 4w of the inverter circuit 4 include an upper arm 41a and a lower arm 41b, which include the power semiconductors that are directly connected. A serial connection point of the power semiconductors of each of the switching circuits 4u, 4v, and 4w may be coupled to the motor/generator (e.g., three-phase AC motor) 5.

Meanwhile, according to an example embodiment of the present invention, each of the switching circuits 4u, 4v, and 4w is independently provided with driving circuits 42 for driving the upper arm 41a and the lower arm 41b The DC voltage is converted into the three-phase AC voltage by alternately switching the upper arm 41a and the lower arm 41b at a duty ratio (e.g., a predetermined duty ratio) by the driving circuit 42.

Meanwhile, the driving command signal (e.g., the control signal) is input to the driving circuit 42 from the control circuit 11, as described below. The N boosting circuits 3 and the inverter circuit 4, which are configured as described above, are controlled by the control circuit 11.

To perform the retrogression-regeneration power control required for the operation of the electric vehicle, the control circuit 11 generates each power semiconductor driving command signal while taking a power linkage (e.g., an optimal power linkage) between each of the boosting circuits 3 and the inverter circuit 4 based on an operation command (e.g., a required operation command) from a generalization control (e.g., the upper ECU) and transfers the corresponding power semiconductor driving command signal to each of the driving circuits 34 and 42 based on a switching command.

Therefore, the power conversion system 100 for electric vehicles performs the retrogression operation (e.g., the downgrade operation) of boosting the DC voltage of the DC main power supply 2 using the boosting circuit 3, converting the DC voltage into an AC voltage using the inverter circuit 4, and outputting the AC voltage to the motor/generator 5. The power conversion system 100 further performs the regeneration operation of supplying the regeneration power of the motor/generator 5 to the DC main power supply 2, the auxiliary equipment 6 of the electric vehicle, and the DC auxiliary power supply 7 via the inverter circuit 4 and the boosting circuit 3.

In one embodiment, the control circuit 11 may be physically separated from the boosting circuits 3 and the inverter circuit 4 (e.g., as a physically separate chip) or may be integrated with the boosting circuits 3 and the inverter circuits 4, which may result in a reduction in costs due to the reduction in the number of parts. The control circuit 11 may be shared (e.g., commonly used by) the boosting circuits 4 and the inverter circuits 4, or a different control circuit 11 may correspond to each of the boosting circuits 3 and the inverter circuits 4.

Further, the control circuit 11, according to an example embodiment, includes a fault detection unit 111 for detecting whether or not each of the boosting circuits 3 is faulty (e.g., broken or malfunctioning or not operating as designed), and a circuit control unit 112, which controls the inverter circuit 4.

According to the example embodiment of the present invention, to independently perform the fault diagnosis on each of the boosting circuits 3, one or more current detection units 12 detect a current flowing in the reactor 32 of each of the boosting circuits 3, which are coupled in parallel (e.g., connected in parallel). The current detection units 12 may sense current between the smoothing capacitors 9 and the reactors 32 of each of the boosting circuits 3.

Further, according to the example embodiment of the present invention, to individually perform the fault diagnosis on each of the boosting circuits 3, the driving circuits 34, which are located in each of the boosting circuits 3, may be configured to have a fault detection function of detecting a fault condition such as a circuit short, overheating, and/or overvoltage of the semiconductor, and outputting the fault signal.

Figure 2:
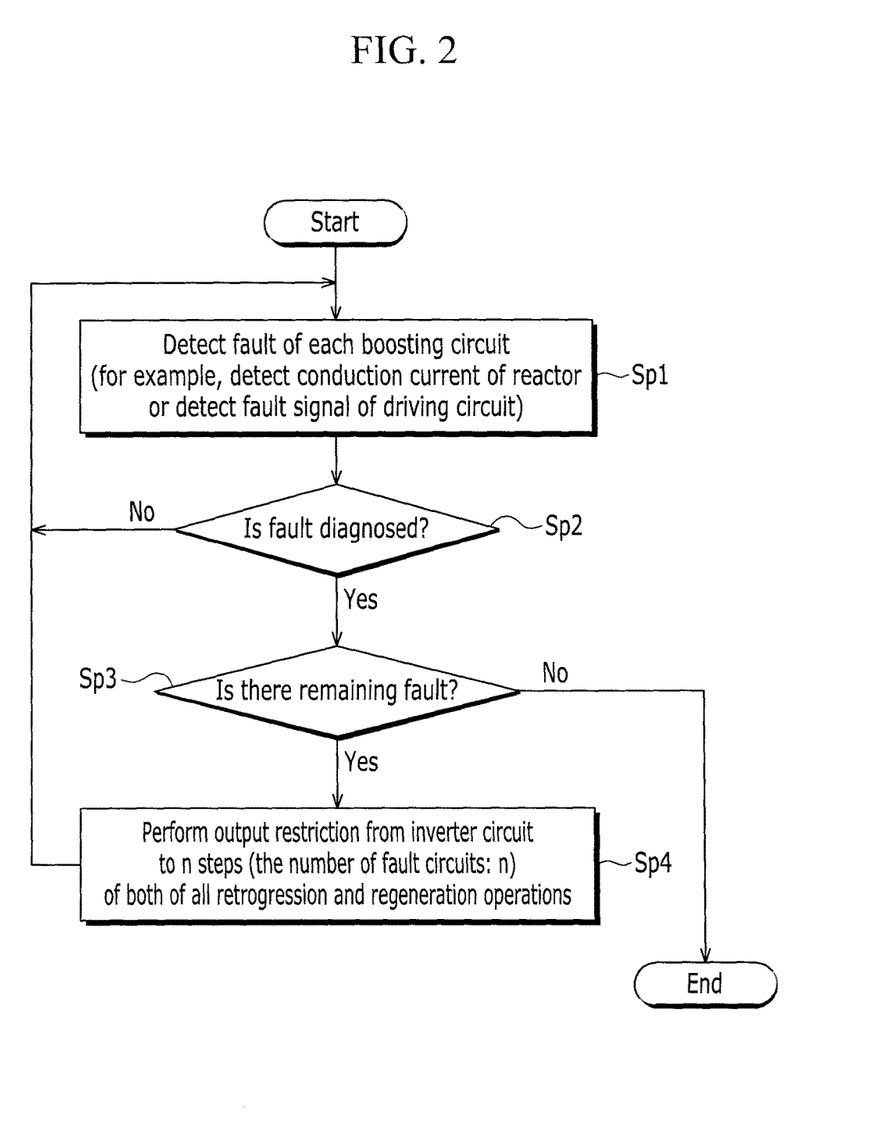
FIG. 2 is a flow diagram illustrating continuous operation processing when a boosting circuit, according to an example embodiment, is faulty.

Hereinafter, by using the control circuit 11, the control process in the event that a boosting circuit is faulty will be described with reference to FIG. 2, along with the functions of the fault detection unit 111 and the circuit control unit 112.

First, at the time of starting the power conversion system 100 for electric vehicles, the fault detection unit 111 acquires a current detection signal of the current detection units 12, which are located in each of the boosting circuits 3 (block Sp1).

Further, the fault detection unit 111 detects whether or not each of the boosting circuits 3 is faulty depending on values of current flowing in the reactors 32 of each of the boosting circuits 3, which are obtained by the current detection units 12 (block Sp2). Further, the fault detection unit 111 acquires the fault signal of the driving circuit 34 including the fault detection function and detects whether or not each of the boosting circuits 3 is faulty (block Sp2).

Further, when the fault is detected, the fault detection unit 111 outputs the fault detection signal to the circuit control unit 112. When the circuit control unit 112 acquires the fault detection signal, the circuit control unit 112 determines whether or not there is a non-faulty (e.g., normally operated) boosting circuit (e.g., a remaining circuit) and stops the operation of the power conversion system 100 for electric vehicles when there are no remaining circuits (block Sp3).

In one embodiment, when there is a normally operated boosting circuit 3 (e.g., a remaining circuit), the circuit control unit 112 stops the operation of the faulty boosting circuit (e.g., the malfunctioning or broken boosting circuit) 3, sets the power control value depending on the number of remaining non-faulty (e.g., normal) boosting circuits (e.g., the number of remaining circuits), and controls the power linkage between the remaining non-faulty boosting circuit(s) 3 and the inverter circuit 4 depending on the power control value (block Sp4).

Figure 3:
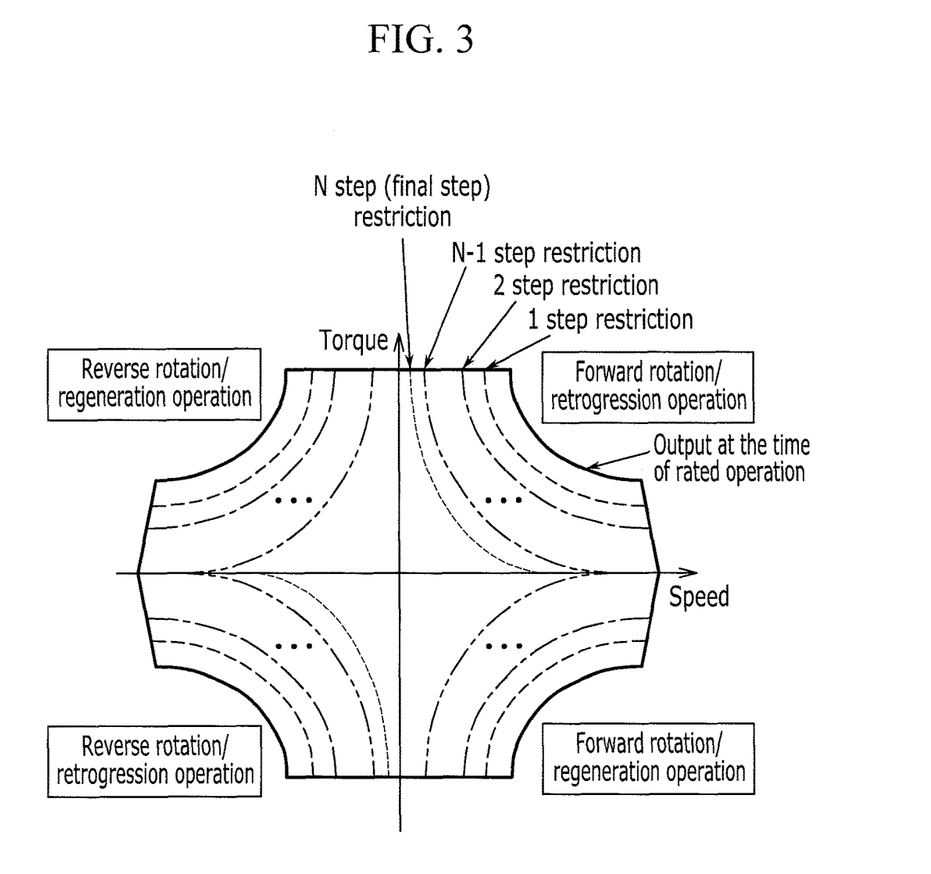
FIG. 3 is a diagram illustrating a power restriction value of an inverter operation when the boosting circuit, according to an example embodiment, is faulty.

In an embodiment, as illustrated in FIG. 3, the circuit control unit 112 performs the retrogression-regeneration power restriction of the motor/generator 5 by the inverter circuit 4 in stepwise fashion depending on the number n (n=1, 2, 3, . . . ).

Therefore, even when some of the boosting circuits 3 are faulty (e.g., not operational or not operating as designed), the retrogression operation or the regeneration operation may be continuously performed.

Herein, the retrogression-regeneration power restriction of the motor/generator 5 by the inverter circuit 4 will be described.

For example, three boosting circuits 3 are coupled in parallel and when a maximum rated output of each of the boosting circuits 3 is about 10 kW, the power conversion system is operated by setting a power upper limit of the inverter circuit 4 to be about 30 kW.

Further, when one boosting circuit 3 is faulty (e.g., malfunctioning not operational or not operating as designed), the power linkage control between the two non-faulty (e.g., normal) boosting circuits 3 and the inverter circuit 4 is performed by setting the power restriction value to be about 20 kW, which is reduced by about 10 kW from the maximum rated output of the faulty boosting circuit.

Thus, the power conversion system 100 for electric vehicles may consider (e.g., utilize) the power supply to the DC main power supply 2 and the auxiliary equipment 6 and the DC auxiliary power supply 7 of the electric vehicle as the regeneration power of the motor/generator 5, omit the alternator, and achieve the reduction in cost and the weight reduction of the electric vehicle.

Further, the boosting circuit 3 may be located in parallel in plural, thereby improving the redundancy for the power supply of the power conversion system 100. In this case, the configuration in which the alternator is omitted, the boosting circuit 3 is located in parallel in plural, thereby improving the effect.

Further, as the plurality of boosting circuit 3 is coupled in parallel, a current may be dispersed to (e.g., provided to) each of the boosting circuits 3, thereby improving performance by, for example, increasing efficiency of the boosting circuit 3 and miniaturizing and expanding the lifespan of the parts.

In addition, when at least one of the boosting circuits 3 is faulty, the power control values depending on the number of remaining non-faulty (e.g., normal) boosting circuits 3 may be set and the remaining non-faulty boosting circuits 3 and the inverter circuit 4 may be controlled based on the power control values, such that the motor/generator 5 may be continuously operated in a power restriction manner even after some of the boosting circuits 3 are faulty. As a result, the regeneration power in the DC main power supply 2, the auxiliary equipment 6 of the electric vehicle, and the DC auxiliary power supply 7 may be recharged. Therefore, it is possible to construct a limp home mode system (e.g., a system that allows an electric vehicle to remain operable despite detecting a serious error), allowing a driver sufficient time to safely evacuate the electric vehicle or move/drive the electric vehicle to a service center or the driver's home.

Further, the smoothing capacitor (e.g., the smoothing condenser) 33 is located in each of the boosting circuits 3 coupled in parallel and therefore each of the smoothing capacitors 33 may be configured to serve as the smoothing capacitor at the input terminal of the inverter circuit 4, thereby reducing a ripple current at the time of charging and discharging the smoothing capacitor 33 when power is exchanged with the inverter circuit 4 by a current dispersion. Therefore, embodiments of the present invention may achieve further miniaturization of the smoothing capacitor 33 or further reduction of loss of the smoothing capacitor 33 and further improvement in the performance of the smoothing capacitor 33, as compared to the related art.

Additionally, the parallel circuit of the smoothing capacitor 33 is configured, thereby further increasing capacitance compared to the related art and further increasing the capacitance per part volume of the smoothing capacitor 33 by structurally integrating the smoothing capacitors 33.

For example, in the regeneration operation of the motor/generator 5, when the switch (DC contactor) or the distribution circuit (junction box), both of which are located at the output terminal of the DC main power supply 2, is faulty (e.g., broken or malfunctioning) and the electric circuit is decoupled from (e.g., disconnected) from the DC main power supply, the capacitance may be increased, thereby improving (e.g., increasing) the fault tolerance of the inverter circuit 4 and the boosting circuit 3.

Further, the parasitic component may be reduced by structurally integrating the smoothing capacitors 33, the fault tolerance of the circuit components may be improved, and at the time of the regeneration operation of the motor/generator 5, the quality of power supplied to each auxiliary equipment 6 and the DC auxiliary power supply 7 of the vehicle may be improved. Meanwhile, the present invention is not limited to the above example embodiments.

For example, the example embodiment may generally perform the retrogression operation (e.g., the downgrade operation) or the regeneration operation by driving all of the plurality of boosting circuits 3, which are coupled in parallel, but may perform the retrogression operation or the regeneration operation by driving some of the boosting circuits 3.

In such an example, when some of the driving boosting circuits 3 are faulty, the boosting circuits 3 are configured to continuously perform the retrogress operation or the regeneration operation by driving the remaining non-faulty boosting circuits 3.

Further, when the fault of the boosting circuit 3 occurs only in the driving circuit 34, main circuit parts, such as the power semiconductors 31a and 31b, the reactor 32, the smoothing capacitor 33, and the like, are faulty and therefore are normally operated, and the power semiconductors 31a and 31b are configured by coupling the freewheeling diodes in an antiparallel configuration, the operation of each of the boosting circuits 3 stops by the control circuit 11. As the current flows in the freewheeling diode, the retrogression operation may be continued in a range of an N step power restriction values illustrated in FIG. 3 by the inverter circuit 4. In this example, the regeneration operation is inhibited (e.g., stopped or prevented).

In addition, the present invention is not limited to the above example embodiments and therefore may be variously changed without departing from the subject of the present invention.

While this invention has been described in connection with what is presently considered to be practical example embodiments, it is to be understood that the invention is not limited to the disclosed embodiments, but, on the contrary, is intended to cover various suitable modifications and equivalent arrangements included within the spirit and scope of the appended claims, and equivalents thereof.

DESCRIPTION OF SOME OF THE REFERENCE NUMERALS

100: Power conversion system for electric vehicles
2: DC main power supply
3: Boosting circuit
32: Reactor
33: Smoothing capacitor (e.g., smoothing condenser)
34: Driving circuit
4: Inverter circuit
5: Motor/generator
6: Auxiliary equipment
7: DC auxiliary power supply
11: Control circuit
12: Current detection unit

What is claimed is:

1. A power conversion system for electric vehicles, the power conversion system for electric vehicles comprising:
a DC main power supply configured to supply a DC voltage;
a smoothing capacitor coupled to the DC main power supply;
a plurality of boosting circuits coupled to the DC main power supply, each of the plurality of boosting circuits being configured to perform a retrogression operation of boosting the DC voltage of the DC main power supply, each one of the plurality of boosting circuits comprising a reactor and a corresponding one of a plurality of driving circuits;
an inverter circuit coupled to the plurality of boosting circuits and configured to convert boosted DC voltage into an AC voltage;
at least one of a motor or generator coupled to the inverter circuit and configured to receive the AC voltage;
a plurality of current detection units corresponding to the plurality of boosting circuits, each of the plurality of current detection units being configured to detect a current flowing in a reactor of a corresponding one of the plurality of boosting circuits; and
a control circuit configured to detect a fault of each of the plurality of boosting circuits based on the detected current flowing in the reactor of each one of the corresponding one of the plurality of boosting circuits, to output a control signal to the plurality of driving circuits to stop an operation of a faulty boosting circuit of the plurality of boosting circuits when at least one of the plurality of boosting circuits is faulty, to set power control values depending on a number of remaining non-faulty boosting circuits of the plurality of boosting circuits, and to control the number of remaining non-faulty boosting circuits and the inverter circuit based on the power control values, such that at least one of the motor or generator is continuously operated in a power restriction manner even after at least one of the plurality of boosting circuits is faulty,
wherein the inverter circuit and the plurality of boosting circuits are configured to perform a regeneration operation of supplying regeneration power to at least one of the DC main power supply, peripheral equipment, or a DC auxiliary power supply; and
wherein a terminal of each of the reactors is coupled to the smoothing capacitor.

2. The power conversion system for electric vehicles of claim 1, wherein the plurality of boosting circuits comprises a plurality of other smoothing capacitors, and wherein each of the plurality of the other smoothing capacitors is configured to operate as a smoothing capacitor for an input terminal of the inverter circuit.

3. The power conversion system for electric vehicles of claim 2, wherein each of the driving circuits is configured to detect a fault of a corresponding one of the plurality of boosting circuits and to generate a corresponding fault signal, and wherein the control circuit is further configured to detect the faulty boosting circuit based on the corresponding fault signal of each of the driving circuits.

4. The power conversion system for electric vehicles of claim 1, wherein each of the driving circuits is configured to detect a fault of a corresponding one of the plurality of boosting circuits and to generate a corresponding fault signal, and wherein the control circuit is further configured to detect the faulty boosting circuit based on the corresponding fault signal of each of the driving circuits.

\* \* \* \* \*